May 8, 1923.
W. B. WESCOTT
1,454,418
TRANSPARENCY AND METHOD OF MAKING THE SAME
Filed Oct. 22, 1915
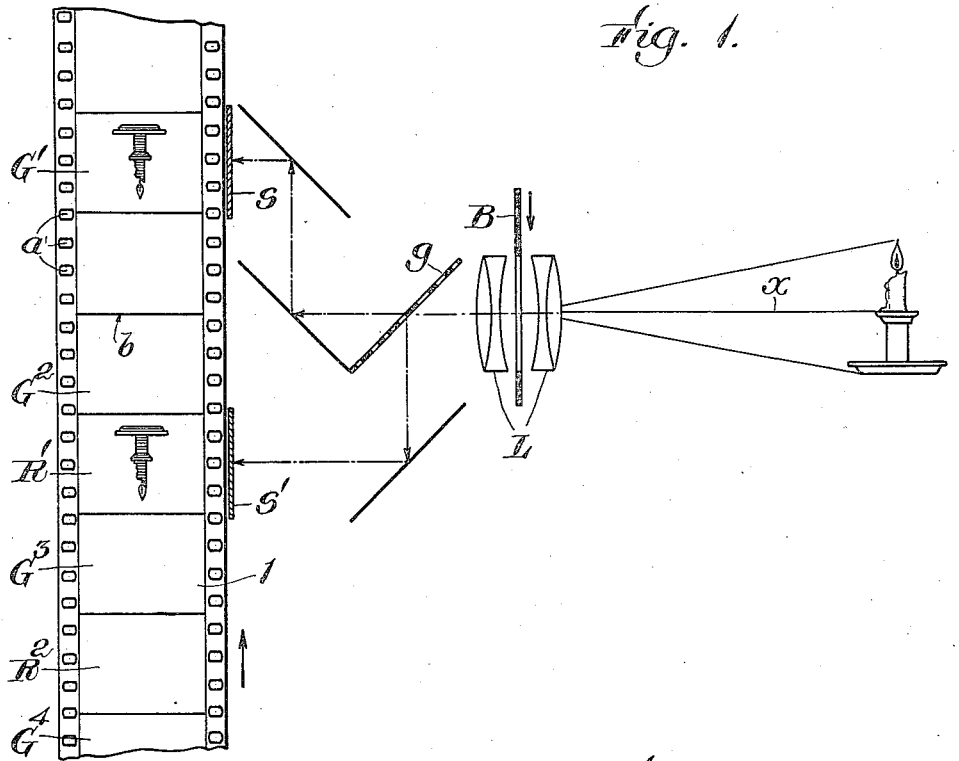

Patented May 8, 1923.

1,454,418

UNITED STATES PATENT OFFICE.

WILLIAM BURTON WESCOTT, OF WELLESLEY, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

TRANSPARENCY AND METHOD OF MAKING THE SAME.

Application filed October 22, 1915. Serial No. 57,346.

*To all whom it may concern:*

Be it known that I, WILLIAM BURTON WESCOTT, a citizen of the United States, and resident of Wellesley, in the county of Norfolk and State of Massachusetts, have invented new and useful Improvements in Transparencies and Methods of Making the Same, of which the following is a specification.

My invention relates to a strip or series of negative or positive photographic transparencies adapted for use as the prime record or negative from which series of like positives or negatives may be reproduced; or when positive, adapted for projection through a suitable image-forming optical train to produce on a distant screen a series of images, which may be superposed, and may succeed each other in a relation of time and duration suitable for motion pictures; and to the art of making such a strip or series of transparencies.

One object of my invention is to provide an article of manufacture of this nature having upon it related or complementary images for simultaneous projection formed by the photographic effect from the same image field of different wave-lengths of light, or light of different or predominantly different colors, whereby the projection of a direct positive through absorption screens transmitting light of a wave-length or color related to that employed for forming the negative will combine upon the screen as a single projection in the natural colors of the original object. Other objects of my invention are to so arrange the successive images, whether negative or positive, as to secure upon the screen simultaneous superposed images taken from the same point of view, and therefore free from stereoscopic distortion of one with respect to the other.

In the accompanying drawings,

Fig. 1 is a schematic diagram illustrating a negative film and steps taken in its production;

Fig. 2 is a diagram illustrating a positive film and one use thereof.

Both the negative and the positive may have the characteristics, familiar to those skilled in the art, of a film or strip adapted to motion picture projection, comprising a continuous ribbon of a transparent supporting body coated with a sensitive emulsion and having at its edges, if desired, openings $a$ to be engaged by the mechanical means employed in camera or projector for advancing the film.

In the article of commerce so far defined and as at present known, successive spaces on the film are occupied by successive pictures similarly arranged in a geometrical sense with respect to the strip of film.

My new device may comprise, for instance, bodily separated groups of similarly oriented complemental pictures taken from the same point of view of simultaneous appearances of the object-field, the members of the groups being separated by a plurality of picture spaces. A negative film 1 having a group of two such pictures at $G'$, $R'$ is illustrated in Fig. 1, together with a diagram of one form only of an optical train, forming no part of the invention herein claimed, with the aid of which such images may be satisfactorily produced. The images of any two points in the object-field of the camera lens appear each twice on the film, at equal distances apart measured in the direction of length of the strip, each member of the complementary pair of images of the same point in the object-field lying on one side of and separated from an imaginary axis $b$, which axis may be in the optical axis $x$ of the lens $L$ between two pictures simultaneously made. In one form, that illustrated, this imaginary axis $b$ is displaced from the nearest point of either of the pictures by one full space for one picture, so that there are between each related pair of points in the pictures three full spaces, of which two are available for other pictures.

While I have shown the bottom and top of the pictures as being in the longitudinal axis of the film, it will be apparent that a vertical of the object-field might lie at right angles across the strip of film, and in this case points at one side of the object-field lead or follow in the direction of length of the strip.

In the preferred form of my device illustrated in Fig. 1, the next group of complementary pictures $G^2$, $R^2$ similarly separated and similarly straddling an imaginary axis between them, is displaced in the direction contrary to the motion of the film, so that one member of the group, $G^2$ as shown, occupies that one of the spaces left between the pictures $G'$, $R'$ lying nearer the following member of the separated pair $G'$, $R'$. I prefer to make the film by first exposing the group $G'$, $R'$ simultaneously, then interrupting the light and causing the film to move two picture spaces with respect to the optical axis, and then exposing for group $G^2$, $R^2$, of which one member, $G^2$ as shown, lies in the space between members $G'$, $R'$.

The third group similarly related, $G^3$, $R^3$, is now made after a similar motion in darkness of two spaces of the film, picture $G^3$ filling the space between $R'$ and $R^2$, so that all the space on the film is continuously utilized.

An indefinite succession arranged in like manner is contemplated by my invention.

For some purposes the two pictures of the group $G'$, $R'$ may be precisely alike, but it will be understood that one purpose of my invention is to provide a film in which the images $G'$, $G^2$, $G^3$, etc., are made by the emitted or reflected light of the object-field of a selected range of wave-lengths, or color, for instance being taken through an absorption screen $s$ having a maximum transmission in the green, while the companion picture $R'$ is taken by the light of the complementary wave-length emitted by the object-field, for instance through an absorption screen $s'$ having a maximum transmission lying in the orange-red.

An important quality of the groups of complementary pictures lies in the likeness of geometrical form of the complemental images secured by their relation to the same optical axis. The images of the series $G$ and the images of the series $R$ are geometrically similar divisions or splits of equal or predetermined intensities of a white-light, whole, or natural-color beam of light directed to a focus, as by a suitable lens $L$, and divided by a half-silvered surface $g$, or equivalent device, adapted to transmit approximately half the light and to reflect approximately half the light. The divisions of the beam may thereafter, if desired, be separately, selectively absorbed at screens $s$, $s'$, before impingement upon the sensitive surface. The apparatus, which forms no part of this invention, as shown in the diagrams implies optically equivalent paths for the divided beam of light, in order to practise the step, forming geometrically like separate images. Apparatus of the type referred to is illustrated in the co-pending application for Letters Patent of the United States by Daniel F. Comstock, S. No. 54,270, filed Oct. 5, 1915, now Patent No. 1,231,710, dated July 2, 1917. In form, i. e., in the relation of position of any one point in any dimension in the object-field to the geometrical center or boundaries of each picture space of the film, the images are identical, and are thereby to be distinguished from simultaneous pairs of pictures made from any two points of view respectively, in which case points separated in the line of sight differ in angular position in each of the optical systems, and are not and can not be superposed without overlapping, as well illustrated by the stereoscope of common knowledge.

The pictures of my film are therefore characterized by recurrent simultaneous like pairs, of which the members are geometrically identical; but in which there may be differences relating to the wave-length of light emitted or reflected by the object pictured.

If in the object-field there should exist, for instance, separated objects, the first emitting light of the pure color of the absorption screen $s$, and the other emitting light of the pure color of the screen $s'$, the pictures of the series $G$ will bear a full image of the first object and no image of the second object, but on the complementary series $R$ the pictures will bear a full image of the second object and none of the first object. An infinite gradation of intensity of image may exist relatively between the complemental pairs of series $G$ and series $R$.

Referring now to Fig. 2, a positive 2 printed by direct contact or other means giving a reversed image of the negative illustrated in Fig. 1 will provide similar pictures $g'$, $r'$, $g^2$, $r^2$ in which the transparent or translucent places represent light emitted by the object-field in the wave-lengths passed by the absorption screen employed in taking the series $G'$, $G^2$ etc., of the negative, and it will be readily understood that my invention contemplates the use of the positive strip in a projector provided with means for projecting the positive images by light colored accordingly, so that the combined image superposed on the screen of the pairs $g'$, $r'$, $g^2$, $r^2$, etc., produces upon the eye the relative distribution and intensities of the selected complementary colors, and therefore reproduces with a close approach to accuracy the natural colors of the original object-field.

A further quality of my new strip of transparencies will now be apparent. If a part of the object-field is a rapidly moving object, successive complemental images $G'$, $R'$; $G^2$, $R^2$, can have no alteration in position of one color with respect to another color in any pair due to movement of the object. The complemental pairs are simultaneous [both being exposed, for instance, by operation of shutter B at lens L during rest of the film, at and during the same time]. It will be clear that the mechanical relation of each component of the pair with respect to the film or support 1 carrying both is constant, and that changes due to temperature, shrinkage or expansion, or errors of mechanical positioning with respect to the optical system are like both in amount and direction with respect to both components equally in both positive 1 and negative 2. It is well known that for projection purposes the errors due to temperature, mechanical motion and shrinkage, heavily magnified at the screen, are difficult to overcome even when the projection is monochromatic, and I am not aware of any system of color-projection which has been wholly successful in registering simultaneously projected images on the screen, a defect which I ascribe to a faulty type of the transparency or transparencies forming the object for projection. By use of my new film in which the complemental groups are part of the same integral strip, and spaced as described, I have succeeded in making such changes occur, as constant errors, which, when once overcome by an adjustment of the projector made possible by the spacing apart of the pictures, are either finally eliminated for a whole series of pictures, or change but slowly as between distant parts of the same film, and which therefore may be corrected for by eye and hand with practical success.

Once brought into relation to a projection device such as that suggested only in Fig. 2, as one instance of many different forms of device which may be employed, it will be perceived that images of each pair $g'$, $r'$, etc., through the respective lenses $L'$, $L^2$ and absorption screens $s^2$, $s^3$, for colors related to those absorbed by screens $s$, $s'$ may be brought into registry at the screen S by adjustment of the position or the virtual position of the optical axes $y'$, $y^2$ of the lenses $L'$, $L^2$, and that thereafter successive other pairs will either accurately register or depart from registry so slowly that manual adjustment at the lenses is sufficient to maintain registry. To permit such adjustment, the physical separation of the optical axes of lenses $L'$, $L^2$ is of great practical importance.

Other advantages as an article of use for motion picture projection flow from the separation of the pictures. The means acting on the film to advance and position it may engage the film at or throughout the space between the components of the groups of pictures, and it will be evident that probability of error of position will thereby be reduced, and made to affect the complemental members of a simultaneously projected group alike, to secure accurate superposition of the images at the screen as compared with the error to be expected of a film engaged by its moving devices on one side of a group of such images.

I do not herein claim such a projection device, and it will be evident that the complemental pairs of transparencies characteristic of my new film may be projected by any convenient arrangement permitting images in light of the respective colors to be simultaneously formed in registry at the screen. It will be apparent that the separation of the components of the complemental pairs is valuable to the mechanical design of such a projection apparatus, enabling a sound construction of the mechanism using the film flowing from the mechanical separation of the optical axes of the respective image-forming lenses.

But it is not essential in order to obtain many of the advantages of my invention that the registering complemental images shall be simultaneously projected. Having been formed simultaneously from the same point of view, images of the respective colors may be correctively displayed on the screen in succession, the film remaining stationary, the effect of persistence of vision being relied upon to combine the successive differently colored registering images in an impression upon the observer similar to that due to superposed simultaneous projection, motion of the film for a new set of complemental images occurring after the successive display of the components of the previous set. I do not prefer such successive display of the color components of the combined image, believing it to be one cause of excessive fatigue to the eyes observed in connection with a well-known form of colored motion pictures depending on successive display of images of the different colors, but it will be apparent that my new transparency will permit such display if desired with the great advantage of a rigid likeness in the successive pictures of differenet color, so that moving objects displayed will not be preceded and followed by a fringe or strip of the respective colors due to movement of the moving object during the time interval between taking a picture in one color and taking the next picture in another color.

It will be observed that having arranged the components of my transparency for simultaneous display of all the elements of color of each interval of illumination, that I am enabled to employ all of the projecting light at each illumination, and thereby to secure a resultant total illumination of the persistent images of the successive components of the series greatly increased as effective to the observer, while avoiding the fatigue of attempting to combine in the eye pictures not registering exactly on the screen.

What I claim is:

1. The art of making motion picture transparencies, comprising the simultaneous exposure of different parts of the same sensitive surface, to a plurality of images of the same object-field, viewed from the same point through optically like paths.

2. The art of making motion picture transparencies having series of groups of pictures of which the members are geometrically similar, comprising simultaneously exposing a plurality of picture spaces separated by a plurality of similar spaces of a sensitive surface to a plurality of images formed by light gathered along a single optical axis, and taking a plurality of optically equivalent paths and thereafter moving the sensitive surface through a plurality of spaces and exposing another similar plurality of picture spaces to a plurality of geometrically like images similarly formed.

3. The art of making motion picture transparencies comprising the simultaneous exposure, to a plurality of images formed in the same plane of the same object-field viewed from the same point, of different parts of the same sensitive surface lying in said plane, the images being formed through optically like paths and subjected severally to different color absorption.

4. The method of forming on a continuous sensitive strip photographic transparencies for projection of colored pictures, comprising photographing upon separated picture spaces of said strip the aspects of the same object-field, from a single point of view, in light of predominantly different colors, said picture spaces being separated by intervening spaces and the photographed images being geometrically alike.

5. A transparency for motion pictures bearing two intercalated series of pictures of which complemental pairs, one in each series, are geometrically alike and separated by at least one picture space.

6. A transparency bearing a series of groups each of complementary geometrically like simultaneous photographs separated by a plurality of spaces for members of similar groups.

7. A transparency for motion pictures bearing a series of complemental groups of pictures, each group of pictures representing from the same point of view the same object-field at the same time, the pictures being geometrically alike and thereby adapted to be projected in superposed fitting relation in exact registry.

8. A transparency for motion pictures bearing complemental series of pictures representing different color values respectively, pictures of respective series being intercalated longitudinally of the transparency and representing the same object-field from the same point of view at the same time, the pictures being geometrically alike and thereby being adapted to be superposed in fitting relation in exact registry.

Signed by me at Boston, Massachusetts, this 19th day of October, 1915.

WILLIAM BURTON WESCOTT.